United States Patent
Boyd et al.

(10) Patent No.: US 12,083,951 B2
(45) Date of Patent: Sep. 10, 2024

(54) LIGHT SECURING DEVICE HAVING A PLURALITY OF LEGS FOR SECURING A LIGHTING DEVICE TO A STRUCTURE

(71) Applicant: R.A. Phillips Industries, Inc., Santa Fe Springs, CA (US)

(72) Inventors: Jonathon Boyd, Loveland, CO (US); John Sasta, Shelby Township, MI (US)

(73) Assignee: R.A. PHILLIPS INDUSTRIES, INC., Irvine, CA (US)

( * ) Notice: Subject to any disclaimer, the term of this patent is extended or adjusted under 35 U.S.C. 154(b) by 0 days.

(21) Appl. No.: 18/435,840

(22) Filed: Feb. 7, 2024

(65) Prior Publication Data

US 2024/0262285 A1  Aug. 8, 2024

Related U.S. Application Data

(60) Provisional application No. 63/483,729, filed on Feb. 7, 2023.

(51) Int. Cl.
*B60Q 1/26* (2006.01)
*B60Q 1/30* (2006.01)

(52) U.S. Cl.
CPC .......... *B60Q 1/2623* (2013.01); *B60Q 1/2653* (2013.01); *B60Q 1/305* (2013.01)

(58) Field of Classification Search
CPC .................................................. B60Q 1/2623
See application file for complete search history.

(56) References Cited

U.S. PATENT DOCUMENTS

| 4,516,824 | A | 5/1985 | Winogrocki et al. |
| 7,572,043 | B2 | 8/2009 | Kolstee et al. |
| 2003/0035300 | A1 | 2/2003 | Branstetter |
| 2013/0148374 | A1 | 6/2013 | Branstetter |
| 2014/0293637 | A1 | 10/2014 | Datz et al. |
| 2016/0375822 | A1* | 12/2016 | Ehrlich .................. B60R 25/00 362/549 |

FOREIGN PATENT DOCUMENTS

EP   2 058 176 A1   5/2009

OTHER PUBLICATIONS

International Search Report issued in corresponding International PCT Application No. PCT/US2024/014868, dated Jun. 19, 2024, 4 pages.
Written Opinion issued in corresponding International PCT Application No. PCT/US2024/014868, dated Jun. 19, 2024, 5 pages.

* cited by examiner

*Primary Examiner* — Joseph L Williams
(74) *Attorney, Agent, or Firm* — Lewis Roca Rothgerber Christie LLP

(57) ABSTRACT

A light securing device includes an exterior body having an opening configured to accommodate a lighting device and including a peripheral portion configured to contact a first surface of a structure; and a plurality of legs extending from the peripheral portion, a leg of the plurality of legs including a stem extending in an insertion direction of the lighting device, and a securing mechanism extending away from the stem and configured to contact a second surface of the structure opposite the first surface to secure the lighting device to the structure.

20 Claims, 6 Drawing Sheets

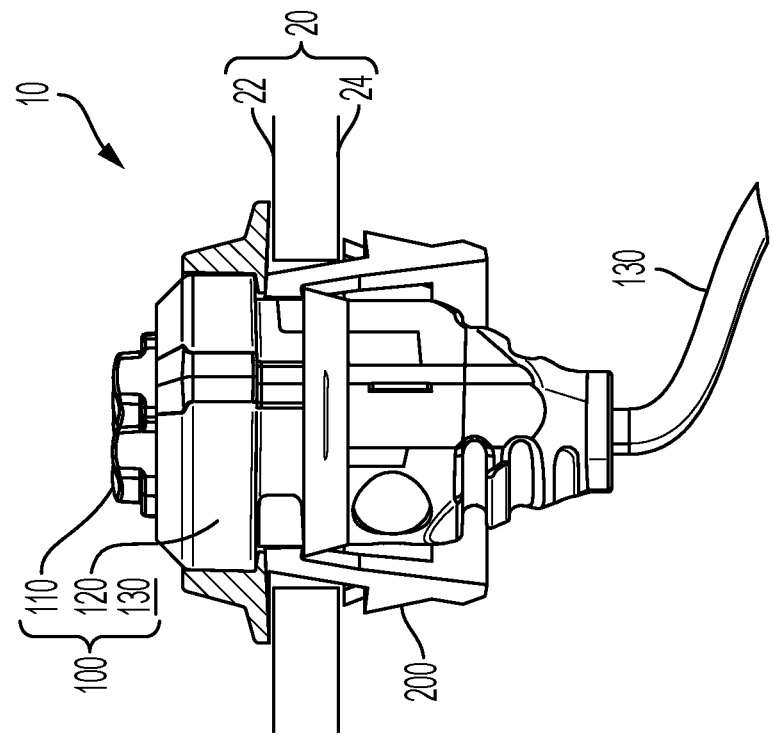
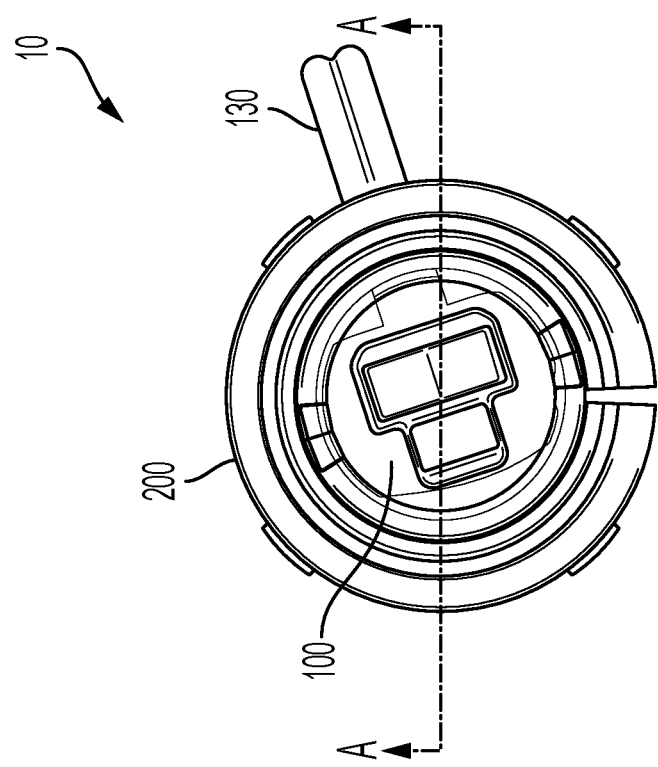
FIG. 1B
FIG. 1A

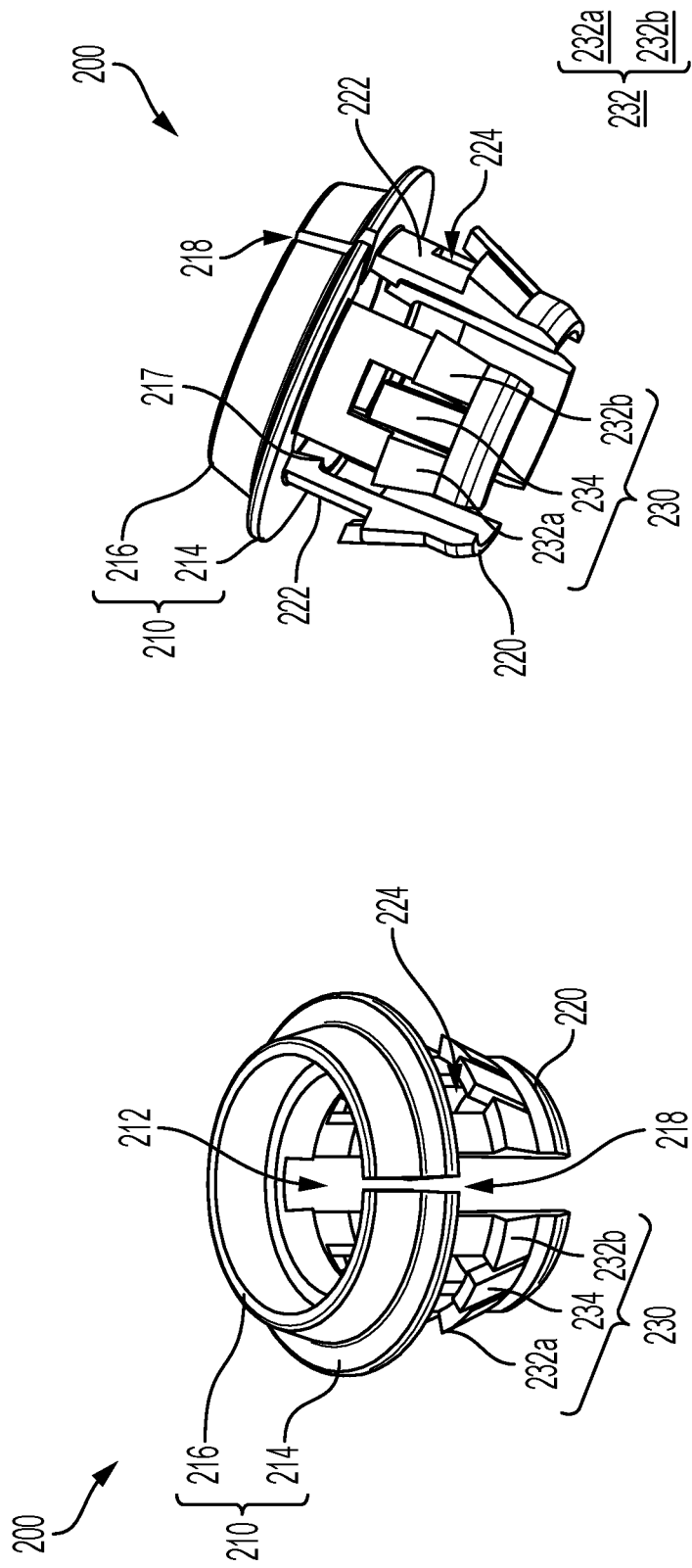

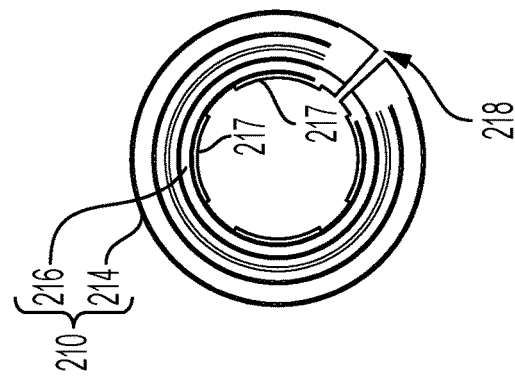
FIG. 2D
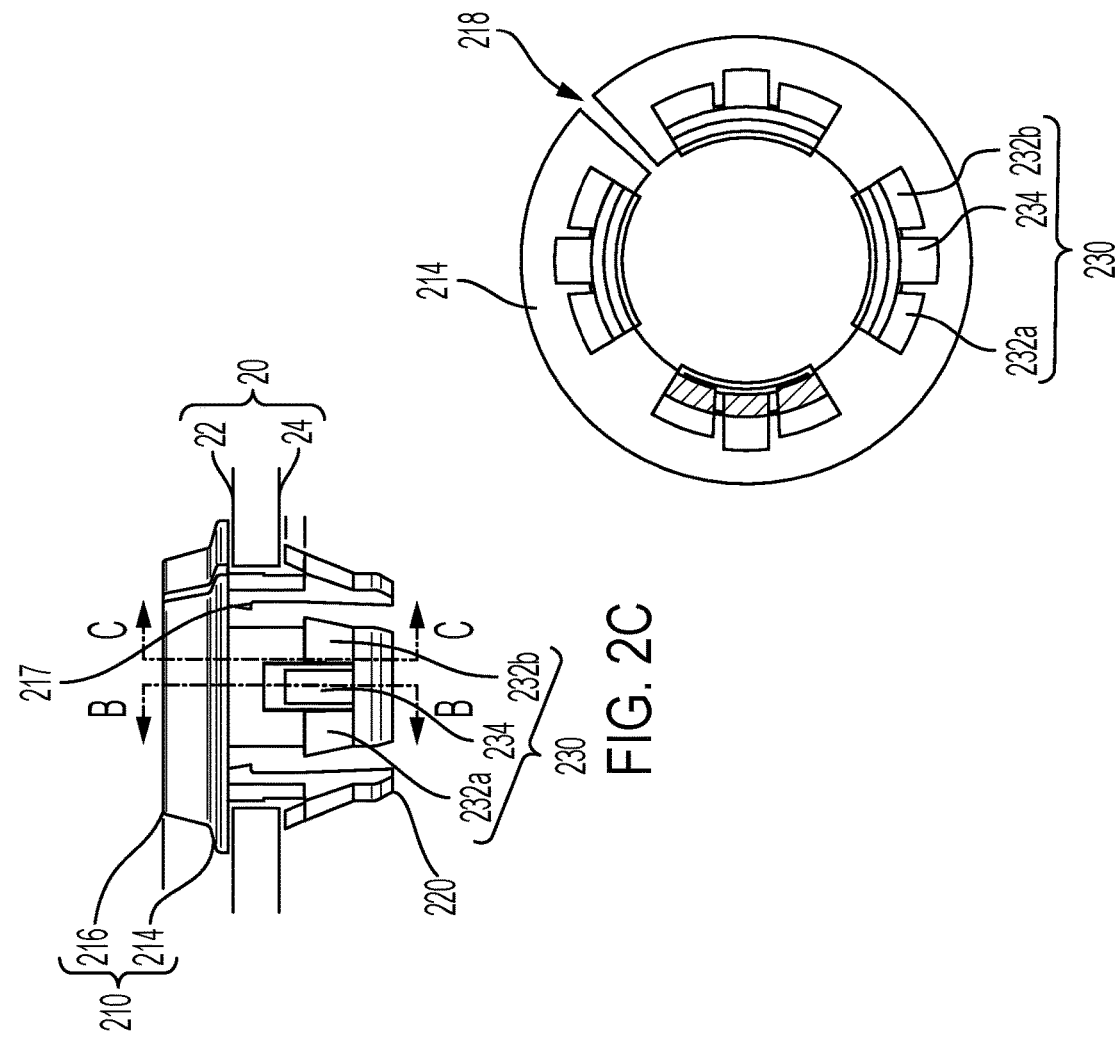
FIG. 2E
FIG. 2C

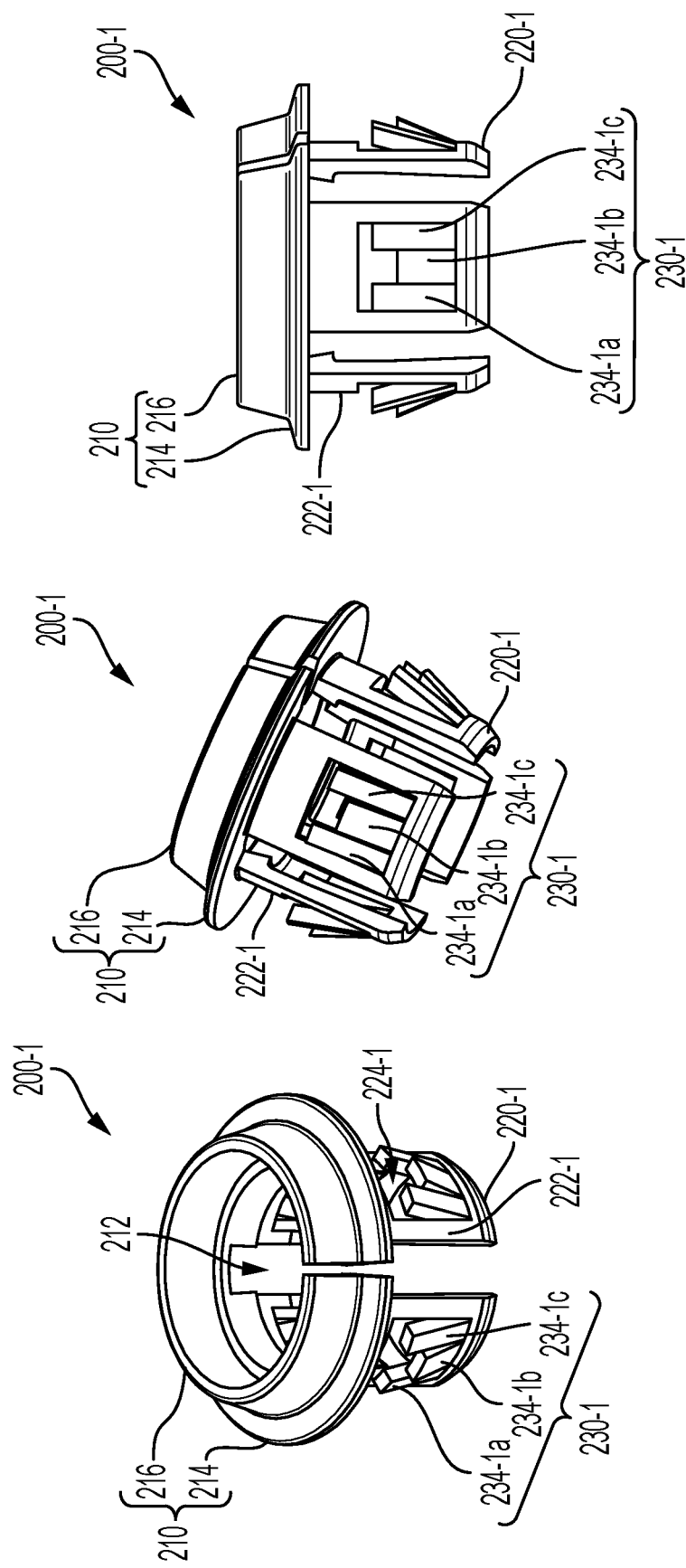

LIGHT SECURING DEVICE HAVING A PLURALITY OF LEGS FOR SECURING A LIGHTING DEVICE TO A STRUCTURE

CROSS-REFERENCE TO RELATED APPLICATION(S)

This application claims priority to, and the benefit of, U.S. Provisional Application No. 63/483,729 ("PENNY LIGHT SECURITY GROMMET"), filed on Feb. 7, 2023, the entire content of which is incorporated herein by reference.

FIELD OF THE INVENTION

Aspects of the present invention relate to the field of vehicular lights.

BACKGROUND

Penny lights are small lights meant for various lighting applications on the exterior perimeter of the tractor trailer unit. The grommet that surrounds penny lights is crucial in securing the light to the mounting surface of the tractor trailer and dampening vibrations. However, the light and grommet can be easily removed from the mounting surface and, recently, theft of such lights has become more common. Stolen lights may be costly to replace for the operator, and if missing lights go unnoticed and are not replaced, they could lead to costly fines as dictated by the Federal Motor Carrier Safety Administration (FMCSA).

Anti-theft solutions involving the use of clamps or zip-ties to clamp the back end of the grommet are labor intensive and costly (especially when installing many lights on a vehicle), and may not even be feasible in tight spaces where a hand may not fit.

The above information disclosed in this Background section is only for enhancement of understanding of the invention, and therefore it may contain information that does not form the prior art that is already known to a person of ordinary skill in the art.

SUMMARY

Aspects of some embodiments of the invention are directed toward a light securing device and a light assembly using the same, which provide anti-theft protection. In some embodiments, the light securing device has a plurality of legs with integrated securing mechanisms that can prevent the unauthorized removal of the light assembly from its mounting surface once installed.

According to some embodiments of the present disclosure, there is provided a light securing device including: an exterior body having an opening configured to accommodate a lighting device and including a peripheral portion configured to contact a first surface of a structure; and a plurality of legs extending from the peripheral portion, a leg of the plurality of legs including: a stem extending in an insertion direction of the lighting device; and a securing mechanism extending away from the stem and configured to contact a second surface of the structure opposite the first surface to secure the lighting device to the structure.

In some embodiments, the securing mechanism and the peripheral portion are configured to securely lock the lighting device to the structure.

In some embodiments, the structure is a wall of a vehicle, the lighting device is a marker light, and the light securing device is configured to at least partially fit within an aperture formed in the structure.

In some embodiments, the stem has a first end coupled to the exterior body and a second end coupled to the securing mechanism.

In some embodiments, the securing mechanism includes: a fixed member protruding from the stem toward the peripheral portion; and a moveable member coupled to an end of the stem opposite from the peripheral portion and configured to flex inward toward the stem in response to the light securing device being inserted into an aperture of the structure.

In some embodiments, in response to the light securing device being fully inserted into the aperture and the structure having a first thickness, the moveable member is configured to move outward away from the stem and to engage the second surface of the structure to secure the lighting device to the structure.

In some embodiments, in response to the light securing device being fully inserted into the aperture and the structure having a second thickness, the fixed member is configured to engage the second surface of the structure to secure the lighting device to the structure.

In some embodiments, a top surface of the moveable member is closer to the peripheral portion than that of the fixed member.

In some embodiments, top surfaces of the fixed and moveable members are substantially parallel to a bottom surface of the peripheral portion.

In some embodiments, the fixed member includes: a first fixed member and a second fixed member, wherein the moveable member is positioned between the first and second fixed members.

In some embodiments, the stem has a stem opening, and the moveable member is configured to flex into the stem opening in response to the light securing device being inserted into the aperture of the structure.

In some embodiments, the exterior body and the plurality of legs form a single monolithic unit, and the securing mechanism is integrated with the stem.

In some embodiments, the light securing device includes flexible material, and the plurality of legs are configured to flex inward in response to being inserted through an aperture of the structure.

In some embodiments, the peripheral portion has a ring shape and is formed around the opening, and the exterior body has a slit therethrough to allow for passage of a wire of the lighting device.

In some embodiments, the securing mechanism includes: a first moveable member; and a second moveable member having a length greater than that of the first moveable member, wherein the first and second moveable members are coupled to an end of the stem opposite from the peripheral portion and are configured to flex inward toward the stem in response to the light securing device being inserted into an aperture of the structure.

In some embodiments, the securing mechanism has a grating structure moveably coupled to the stem and including a plurality of saw-tooth protrusions, each being configured to engage a second surface of a structure of a different thickness.

In some embodiments, the stem has a stem opening, and the securing mechanism is configured to flex toward and fit within the stem opening in response to the plurality of legs being inserted into an aperture of the structure, and to engage the second surface of the structure via one of the plurality of saw-tooth protrusions in response to the legs being fully inserted into the aperture.

According to some embodiments of the present disclosure, there is provided a light assembly including: a lighting device including: a light source configured to emit light; and a light housing attached to and configured to accommodate the light source; and a light securing device including: an exterior body having an opening configured to accommodate the light housing and including a peripheral portion configured to contact a first surface of a structure; and a plurality of legs extending from the peripheral portion, a leg of the plurality of legs including: a stem extending in an insertion direction of the light; and a securing mechanism extending away from the stem and configured to contact a second surface of the structure opposite the first surface to secure the lighting device to the structure.

In some embodiments, the peripheral portion has a ring shape and is formed around the opening, and the peripheral portion has a slit therethrough to allow for passage of a wire of the lighting device.

In some embodiments, the structure is a wall of a vehicle, and the wire of the lighting device is over-molded with a corresponding electrical wire of the vehicle.

BRIEF DESCRIPTION OF THE DRAWINGS

The accompanying drawings, together with the specification, illustrate exemplary embodiments of the invention, and, together with the description, serve to explain aspects of embodiments of the invention. In the drawings, like reference numerals are used throughout the figures to reference like features and components. The figures are not necessarily drawn to scale. The above and other features and aspects of the invention will become more apparent from the following detailed description of illustrative embodiments thereof with reference to the attached drawings, in which:

FIG. 1A illustrates a top view of the light assembly, according to some embodiments of the present disclosure;

FIG. 1B illustrates a cross-sectional view of the light assembly taken along the line AA of FIG. 1A, according to some embodiments of the present disclosure;

FIGS. 2A and 2B respectively illustrate top and bottom perspective views of the light securing device, according to some embodiments of the present disclosure;

FIGS. 2C, 2D, and 2E respectively illustrate side, top, and bottom views of the light securing device, according to some embodiments of the present disclosure;

FIGS. 3A, 3B, and 3C respectively illustrate a top perspective view, a bottom perspective view, and a side view of the light securing device, according to some other embodiments of the present disclosure.

DETAILED DESCRIPTION

Figure 2G:
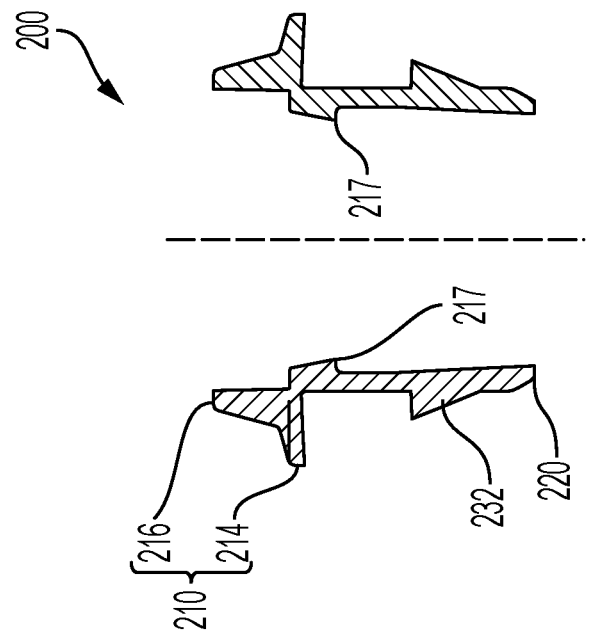
FIGS. 2F and 2G respectively illustrate cross-sectional views of the light securing device taken along the lines BB and CC, respectively, according to some embodiments of the present disclosure.

The detailed description set forth below is intended as a description of example embodiments of the invention, and is not intended to represent the only forms in which the invention may be constructed or utilized. The description sets forth the features of the invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Aspects of some embodiments of the invention are directed to a light securing device (e.g., a light security grommet) and a light assembly including the same that can prevent or substantially stymie the unauthorized removal of a lighting device (e.g., a marker light, also known as a "penny" light) from the mounting surface of a structure (such as a vehicle) once the light assembly is installed. In some embodiments, the light securing device also includes a number of legs surrounding the housing of the lighting device and having integrated securing mechanisms that are configured to secure the lighting device to the structure and to prevent theft by pulling or prying out the lighting device, such as with a screwdriver.

FIG. 1A illustrates a top view of the light assembly 10, according to some embodiments of the present disclosure. FIG. 1B illustrates a cross-sectional view of the light assembly 10 taken along the line AA of FIG. 1A, according to some embodiments of the present disclosure.

Referring to FIGS. 1A-1B, the light assembly (e.g., the anti-theft light assembly) 10 may be mounted on a surface of a structure (e.g., a mounting structure) 20. For example, the light assembly 10 may be mounted to the exterior perimeter of a vehicle (e.g., a tractor, a trailer, a chassis, etc.) to improve the visibility of the vehicle and to help reveal the entire size and length of the vehicle, especially during nighttime driving. In some examples, the light assembly 10 may be mounted along the top of the back end or sides of a vehicle. However, the position of the light assembly 10 is not limited thereto, and light assembly 10 may be positioned at any suitable location on the vehicle. Further, the application of the light assembly 10 is not limited to a particular type of vehicle or even to a vehicle and the light assembly 10 may be used in any suitable application.

In some embodiments, the light assembly 10 includes a lighting device (e.g., a lamp) 100 and a light securing device (e.g., a light security grommet) 200 that encompasses and grips the lighting device 100 and secures (e.g., fixedly secures) the lighting device 100 to a surface of a mounting structure 20. In so doing, a portion of the light securing device 200 may pass through and be affixed to an aperture formed in the structure. The lighting device 100 may include a light source (e.g., a light emitting diode (LED)) 110 that is configured to emit light, a light housing 120 attached to and configured to accommodate the light source 110, and one or more wires 130 that supply electrical power from to the light source 110. The light source 110 may be a light emitting diode (LED) or an incandescent bulb that receives electrical power from the electrical system of a vehicle (e.g., a trailer) through the one or more wires 130. The light source 110 may have a red lens, which allows the light source 110 to emit a red light; a yellow-amber lens, which allows the light source 110 to emit a generally yellow-amber light; or a clear lens. The light assembly 10 may be used as a clearance lamp, a marker lamp (e.g., a side marker lamp), or an identification lamp.

Figure 2F:
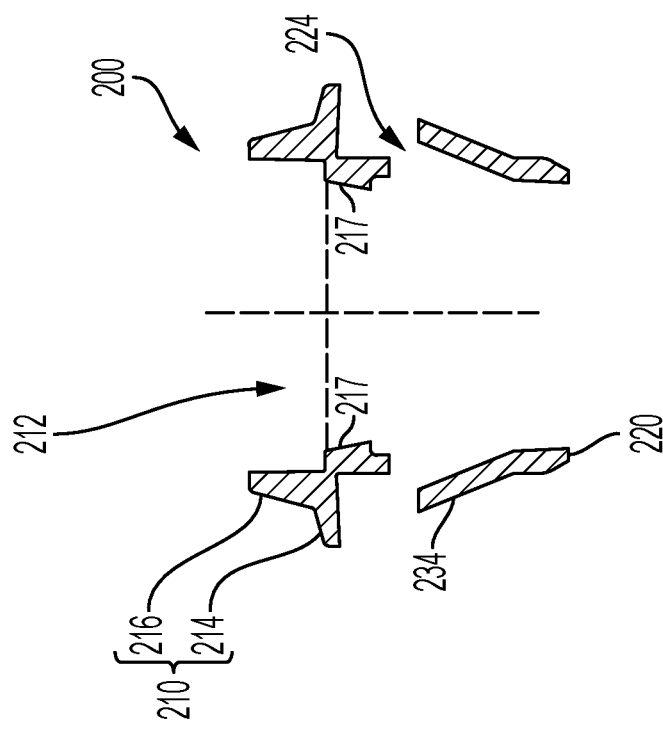

FIGS. 2A and 2B respectively illustrate top and bottom perspective views of the light securing device 200, according to some embodiments of the present disclosure. FIGS. 2C, 2D, and 2E respectively illustrate side, top, and bottom views of the light securing device 200, according to some embodiments of the present disclosure. FIGS. 2F and 2G respectively illustrate cross-sectional views of the light securing device 200 taken along the lines BB and CC, respectively, according to some embodiments of the present disclosure.

Referring to FIGS. 2A-2G, in some embodiments, the light securing device 200 includes an exterior body 210 that defines an opening 212, which is configured to accommodate the lighting device 100. The exterior body 210 includes a peripheral portion (e.g., a flange or lip portion) 214 that is configured to contact and become flush with a first surface (e.g., outer/external surface) 22 of a structure 20, and a plurality of legs 220 that surround the opening 212 and extend away from the peripheral portion 214 along the same general direction (e.g., an insertion direction of the lighting device 100). The peripheral portion 214 may overhang the legs 220. The outer circumference of the peripheral portion 214 may be greater than the inner circumference of the aperture of the structure 20 into which the light securing device 200 is inserted. This prevents the light securing device 200 from completely passing through the aperture. The exterior body 210 may also have a raised portion (e.g., a collar portion) that wraps around (and, e.g., seals) the lens of the lighting device 100, and an inward protrusion 217 that may catch a corresponding band around the housing of the lighting device 100 thus securely gripping the lighting device 100.

In some embodiments, each of the legs 220 includes a stem 222 extending in an insertion direction of the lighting device 100, and an integrated securing mechanism 230 extending away from (e.g., projecting away from) the stem 222 and configured to contact (and apply pressure to) a second surface (e.g., interior/internal surface) 24 of the structure opposite the first surface 22 once the legs 220 are fully inserted into the aperture of the structure 20. This enables the securing mechanism 230 and the peripheral portion 214 to secure and effectively lock the lighting device 100 in place relative to the structure 20.

The stem 222 may have a first end that is attached to the exterior body 210 and a second end from which the securing mechanism 230 projects. In some embodiments, the securing mechanism 230 includes a fixed member 232 protruding from the stem 222 toward the peripheral portion 216, and a moveable member 234 coupled to the second end of the stem 222 and projecting toward the peripheral portion 216 at an acute angle relative to the stem 222. When projecting outward, the moveable member 234 may have a top surface that is that is substantially parallel to the bottom surface of the peripheral portion 214.

The moveable member 234 may flex inward toward the stem 222 when the light securing device 200 is inserted into the aperture of the structure and may again project outward (e.g., away from the stem) once the legs 220 are fully inserted into the aperture and the free end of the moveable member 234 clears the edge of the aperture at the second surface 24 of the structure 20.

In some examples, the stem 222 also defines a stem opening 224 that is sized to be larger than the moveable member 234. The fixed end of the moveable member 234 may be attached to the bottom of the stem opening 224 and, when the light securing device 200 is inserted into the aperture of the structure 20, the moveable member 234 may retract toward (e.g., may be pushed toward) the stem opening 224 thus allowing the integrated securing mechanisms 230 to clear the structure opening.

The fixed member 232 may have a wedge shape with a flat top surface that is substantially parallel to the bottom surface of the peripheral portion 214 and a tapered portion that tapers down (e.g., linearly tapers down) toward the second end of the stem 222.

In some embodiments, an outer circumference defined by the protruding edges of the moveable members 234 are greater than that defined by the protruding edges of fixed members 232, and both are greater than the inner circumference of the structure aperture. As a result, when inserting the legs 220 through the aperture, the inward compressive force exerted by edges of the aperture cause the moveable members 234 to bend inward and the legs 220 to flex inward sufficiently for the fixed members 232 to clear the edges of the aperture. Once the legs 220 are fully inserted into the aperture (e.g., when the bottom surface of the peripheral portion 214 contacts and becomes flush with the first surface 22 of the structure), the legs 220 may spring back out thus allowing the legs 220 and the peripheral portion to grab the edges of the structure at the aperture. This enables the light securing device 200 to automatically secure the lighting device 100 to the structure without the need for any other securing device such as a zip tie or clamp, which can simplify the installation process of the light securing device 200 and reduce installation costs.

In some embodiments, the fixed member 232 includes a first fixed member 232a and a second fixed member 232b that are positioned at the opposite sides of the moveable member 234. That is, the stem opening 224 may be between the two fixed members 232a and 232b.

In some embodiments, the top surface of the moveable member 234 is closer to the bottom surface of the peripheral portion 214 (thus forming a shorter gap) than that of the fixed member 232. The gap difference between the fixed member 232 and the moveable member 234 allows the light securing device 200 to secure (e.g., securely lock) the lighting device 100 to various walls having different thicknesses. In some examples, the peripheral portion 214 may form a first gap (of, e.g., about ¼ inch) with the moveable member 234 and a second gap (of, e.g., about ⅓ inch) with the fixed member 232. Thus, when the structure has a first thickness substantially equal to the first gap, the moveable member 234 may be in an outward projection state and engage the structure 20 to secure (e.g., securely lock) the light securing device 200 to the structure 20. In this example, the fixed member 232 may not reach the structure 20 (and thus be floating and ineffective). When the structure has a second thickness substantially equal to the second gap, the moveable member 234 may be pressed inward (e.g., into the stem opening 224) and not engage the structure 20, whereas the fixed member 232 may engage the structure 20.

As shown in the figures, the light securing device 200 includes four equally spaced (e.g., radially spaced) legs that surround the opening 212. As a result, a person attempting to steal the light securing device 200 would have to simultaneously use two screw drivers to apply inward force to push in two of the four legs to pry this off, which is significantly more difficult to do than using a single screwdriver to push one leg of the related art security grommets. This makes the light securing device 200 a more effective anti-theft device than the security grommets of the related art. While FIGS. 2A-2E illustrate the use of four legs 220, embodiments of the present disclosure are not limited thereto, and the light securing device 200 may employ any suitable number of legs 220 (such as 3 or 5 or more legs). Further, embodiments of the present disclosure are not limited to equally spaced legs, and the legs 220 may be spaced at different intervals depending on the shape and size of the lighting device 100.

According to some embodiments, the entire light securing device 200 (i.e., the entirety of exterior body 210 and legs 220) is formed as a single monolithic unit, and not of separate components that are attached to one another. This may improve the overall durability and structural integrity of the light securing device 200, making it more resistant to prying attempts, and thus leading to a more resilient anti-theft device. In some examples, despite its complex geometry, the light securing device 200 may be injection molded, which may speed up production and lower manufacturing costs.

In some embodiments, the light securing device 200 is formed of a flexible or semi-flexible, yet durable, material, such plastic. For example, the light securing device 200 may be made of nylon, polycarbonate, or another thermoplastic. In some examples, the material forming the light securing device 200 may also be self-lubricating, such as Nylon 6/6. Thus, when someone attempts to remove the light assembly 10 by using a screwdriver or other implement to get under the peripheral portion and pry, the peripheral portion 216 may flex and give way causing the tip of the screwdriver to slip away. This prevents the light securing device 200 from being pried away, or makes doing so significantly more difficult.

In some embodiments, the exterior body 210 has a slit 218 formed therethrough to permit the passage of the one or more wires 130 of the lighting device 100. The slit 218, which may be expandable by virtue of the exterior body 210 being made of flexible material, allows the light securing device 200 to be used with lighting devices (e.g., marker lights) that are molded as part of a vehicle harness. For example, a permanently-wired lighting device 100 may be secured to the vehicle wall by first passing the lighting device 100 through the wall aperture, from the interior of the vehicle to the outside, passing the one or more wires 130 though the slit 218, inserting the legs 220 of the light securing device 200 through the aperture, and pulling the lighting device 100 into the opening 212 to secure (e.g., lock) both of the whole light assembly 10 to the vehicle wall. This not only makes the wiring more robust against environmental hazards, such as the intrusion of debris, water, moisture, or the like, into the connection point between the lighting device 100 and the internal vehicle wiring), but it also makes theft of the lighting device 100 even more difficult as it would require the additional step of physically cutting the one or more wires 132 (as opposed to pulling away, and detaching, the lighting assembly 10 from a mating connector within the vehicle).

However, embodiments of the present disclosure are not limited thereto, and the exterior body 210 may be contiguously formed without any slits. In such examples, the one or more wires 130 of the lighting device 100 may be electrically connected to the internal vehicle lighting via mating connectors.

While FIGS. 2A-2G illustrate some embodiments in which the securing mechanism 230 includes both fixed and moveable members 232 and 234, embodiments of the present disclosure are not limited thereto. For example, the securing mechanism may not include any fixed members.

FIGS. 3A, 3B, and 3C respectively illustrate a top perspective view, a bottom perspective view, and a side view of the light securing device 200-1, according to some other embodiments of the present disclosure.

The light securing device 200-1 may be substantially the same as the light securing device 200 described above, except for the securing mechanism 230-1. Accordingly, in the interest of brevity, descriptions of overlapping concepts may not be repeated here.

In some embodiments, the securing mechanism 230-1 does not include any fixed members, and instead includes one or more moveable members 234-1, which may be positioned side by side. For example, the securing mechanism 230-1 may include a first moveable member 234-1b and a second moveable member 234-1a/c having a length greater than that of the first moveable member, as shown in FIGS. 3A-3C. Here, the first and second moveable members 234-1b and 234-1a/c are coupled to an end of the stem 222-1 opposite from the peripheral portion 214 and are configured to flex inward toward the stem 222-1 in response to the light securing device 200-1 being inserted into an aperture of the structure 20. The stem opening 224-1 may be greater in size than the stem opening 224 of FIGS. 3A-3G to accommodate the moveable members 234-1. In the example, the two second moveable members 234-1a and 234-1c are longer than the first moveable member 234-1b; however, embodiments of the present disclosure are not limited thereto, and the lengths of the moveable member 234-1 may be varied in a suitable manner.

Figure 4C:
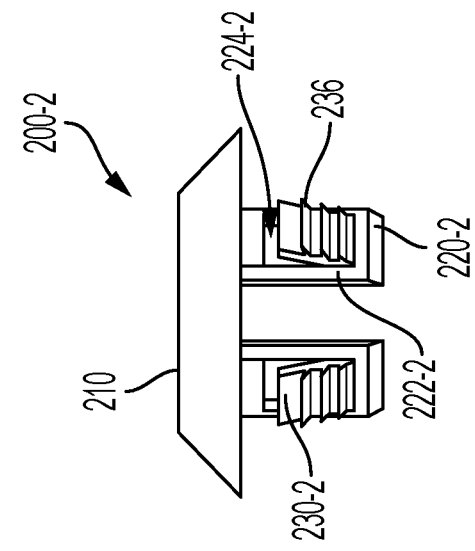
FIGS. 4A, 4B, and 4C respectively illustrate a top perspective view, a bottom perspective view, and a side view of the light securing device, according to still other embodiments of the present disclosure.
Figure 4B:
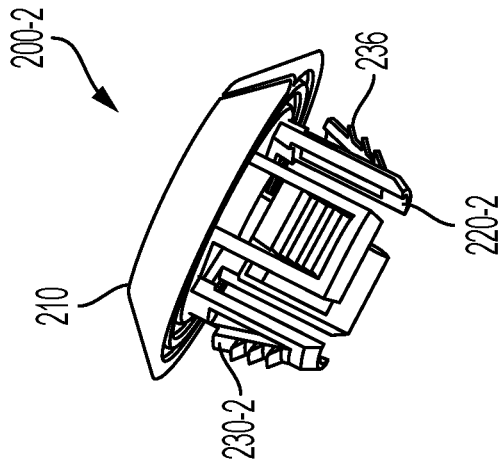
Figure 4A:
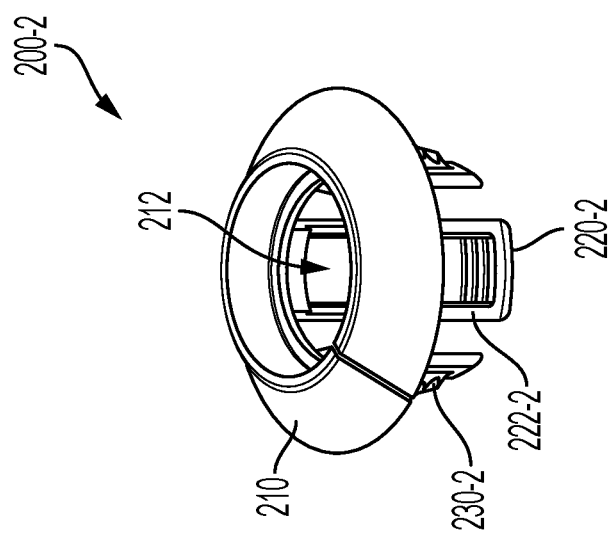

FIGS. 4A, 4B, and 4C respectively illustrate a top perspective view, a bottom perspective view, and a side view of the light securing device 200-2, according to still other embodiments of the present disclosure.

The light securing device 200-2 may be substantially the same as the light securing device 200 described above, except for the securing mechanism 230-2. Accordingly, in the interest of brevity, descriptions of overlapping concepts may not be repeated here.

Accord to some embodiments, the securing mechanism 230-2 of the light securing device 200-2 has a grating structure that is moveably coupled to the stem 222-2 and includes a plurality of saw-tooth protrusions 236, each of which may be able to engage a second surface of a structure 20 of a different thickness. Here, the securing mechanism 230-2 may be configured to flex toward and fit within the stem opening 224-2 when the plurality of legs 220-2 are inserted into the aperture of the structure, and to engage the second surface 24 of the structure 20 via one of the plurality of saw-tooth protrusions 236 when the legs 220-2 are fully inserted into the aperture.

While various securing mechanisms have been illustrated in the figures, embodiments of the present disclosure are not limited thereto, and any integrated securing mechanism having a suitable shape and structure may be used.

As described above, according to some embodiments, the light securing device 200 has an integrated securing mechanism that can prevent or substantially prevent the unauthorized removal/theft of a lighting device 100 (e.g., a marker/penny light) once installed on a structure (e.g., a vehicle) or any other suitable mounting surface.

While this invention has been described in detail with particular references to exemplary embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

It will be understood that, although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when an element is referred to as being "between" two elements, it can be the only element between the two elements, or one or more intervening elements may also be present.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," "comprising," "has," "have," and "having," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. For example, the expression "A and/or B" denotes A, B, or A and B. Expressions such as "one or more of" and "at least one of," when preceding a list of elements, modify the entire list of elements and do not modify the individual elements of the list. For example, the expression "one or more of A, B, and C," "at least one of A, B, or C," "at least one of A, B, and C," and "at least one selected from the group consisting of A, B, and C" indicates only A, only B, only C, both A and B, both A and C, both B and C, or all of A, B, and C.

Further, the use of "may" when describing embodiments of the inventive concept refers to "one or more embodiments of the inventive concept." Also, the term "exemplary" is intended to refer to an example or illustration.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", "in contact with", "in direct contact with", or "immediately adjacent" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art.

As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

What is claimed is:

1. A light securing device comprising:
   an exterior body having an opening configured to accommodate a lighting device and comprising a peripheral portion configured to contact a first surface of a structure; and
   a plurality of legs extending from the peripheral portion, a leg of the plurality of legs comprising:
      a stem extending in an insertion direction of the lighting device; and
      a securing mechanism extending away from the stem and configured to contact a second surface of the structure opposite the first surface to secure the lighting device to the structure.

2. The light securing device of claim 1, wherein the securing mechanism and the peripheral portion are configured to secure the lighting device to the structure.

3. The light securing device of claim 1, wherein the structure is a wall of a vehicle,
   wherein the lighting device is a marker light, and
   wherein the light securing device is configured to at least partially fit within an aperture formed in the structure.

4. The light securing device of claim 1, wherein the stem has a first end coupled to the exterior body and a second end coupled to the securing mechanism.

5. The light securing device of claim 1, wherein the securing mechanism comprises:
   a fixed member protruding from the stem toward the peripheral portion; and
   a moveable member coupled to an end of the stem opposite from the peripheral portion and configured to flex inward toward the stem in response to the light securing device being inserted into an aperture of the structure.

6. The light securing device of claim 5, wherein, in response to the light securing device being fully inserted into the aperture and the structure having a first thickness, the moveable member is configured to move outward away from the stem and to engage the second surface of the structure to secure the lighting device to the structure.

7. The light securing device of claim 5, wherein, in response to the light securing device being fully inserted into the aperture and the structure having a second thickness, the fixed member is configured to engage the second surface of the structure to secure the lighting device to the structure.

8. The light securing device of claim 5, wherein a top surface of the moveable member is closer to the peripheral portion than that of the fixed member.

9. The light securing device of claim 5, wherein top surfaces of the fixed and moveable members are substantially parallel to a bottom surface of the peripheral portion.

10. The light securing device of claim 5, wherein the fixed member comprises:
a first fixed member and a second fixed member,
wherein the moveable member is positioned between the first and second fixed members.

11. The light securing device of claim 5, wherein the stem has a stem opening, and
wherein the moveable member is configured to flex into the stem opening in response to the light securing device being inserted into the aperture of the structure.

12. The light securing device of claim 1, wherein the exterior body and the plurality of legs form a single monolithic unit, and
wherein the securing mechanism is integrated with the stem.

13. The light securing device of claim 1, wherein the light securing device comprises flexible material, and
wherein the plurality of legs are configured to flex inward in response to being inserted through an aperture of the structure.

14. The light securing device of claim 1, wherein the peripheral portion has a ring shape and is formed around the opening, and
wherein the exterior body has a slit therethrough to allow for passage of a wire of the lighting device.

15. The light securing device of claim 1, wherein the securing mechanism comprises:
a first moveable member; and
a second moveable member having a length greater than that of the first moveable member,
wherein the first and second moveable members are coupled to an end of the stem opposite from the peripheral portion and are configured to flex inward toward the stem in response to the light securing device being inserted into an aperture of the structure.

16. The light securing device of claim 1, wherein the securing mechanism has a grating structure moveably coupled to the stem and comprising a plurality of saw-tooth protrusions, each being configured to engage a second surface of a structure of a different thickness.

17. The light securing device of claim 16, wherein the stem has a stem opening, and
wherein the securing mechanism is configured to flex toward and fit within the stem opening in response to the plurality of legs being inserted into an aperture of the structure, and to engage the second surface of the structure via one of the plurality of saw-tooth protrusions in response to the legs being fully inserted into the aperture.

18. A light assembly comprising:
a lighting device comprising:
a light source configured to emit light; and
a light housing attached to and configured to accommodate the light source; and
a light securing device comprising:
an exterior body having an opening configured to accommodate the light housing and comprising a peripheral portion configured to contact a first surface of a structure; and
a plurality of legs extending from the peripheral portion, a leg of the plurality of legs comprising:
a stem extending in an insertion direction of the light; and
a securing mechanism extending away from the stem and configured to contact a second surface of the structure opposite the first surface to secure the lighting device to the structure.

19. The light assembly of claim 18, wherein the peripheral portion has a ring shape and is formed around the opening, and
wherein the peripheral portion has a slit therethrough to allow for passage of a wire of the lighting device.

20. The light assembly of claim 19, wherein the structure is a wall of a vehicle, and
wherein the wire of the lighting device is over-molded with a corresponding electrical wire of the vehicle.

\* \* \* \* \*